(12) United States Patent
Kratzer

(10) Patent No.: US 8,123,193 B2
(45) Date of Patent: Feb. 28, 2012

(54) MAGNETIC VALVE

(75) Inventor: Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 933 days.

(21) Appl. No.: 12/096,684

(22) PCT Filed: Dec. 1, 2006

(86) PCT No.: PCT/EP2006/069222
§ 371 (c)(1),
(2), (4) Date: Jun. 9, 2008

(87) PCT Pub. No.: WO2007/085315
PCT Pub. Date: Aug. 2, 2007

(65) Prior Publication Data
US 2008/0302984 A1 Dec. 11, 2008

(30) Foreign Application Priority Data

Jan. 25, 2006 (DE) .......................... 10 2006 003 491

(51) Int. Cl.
*F16K 31/02* (2006.01)

(52) U.S. Cl. ............. 251/129.18; 137/15.17; 137/15.18; 251/129.15; 251/129.02

(58) Field of Classification Search ............. 251/129.02, 251/129.15, 129.18; 29/700, 255, 263, 280; 335/86, 273; 137/15.01, 15.17, 15.18
See application file for complete search history.

(56) References Cited

U.S. PATENT DOCUMENTS

| | | | | |
|---|---|---|---|---|
| 4,947,893 A * | 8/1990 | Miller et al. ............. | 137/625.65 |
| 4,954,799 A * | 9/1990 | Kumar ..................... | 335/236 |
| 5,129,414 A * | 7/1992 | Glass et al. .............. | 137/10 |
| 5,301,921 A * | 4/1994 | Kumar ..................... | 251/129.08 |
| 5,407,174 A * | 4/1995 | Kumar ..................... | 251/129.08 |
| 5,513,673 A * | 5/1996 | Slavin et al. ............. | 137/625.65 |
| 5,586,747 A * | 12/1996 | Bennardo et al. ........ | 251/129.18 |
| 6,084,493 A | 7/2000 | Siegel | |
| 6,443,422 B1 * | 9/2002 | Gluf, Jr. ................... | 251/129.18 |
| 6,644,623 B1 * | 11/2003 | Voss et al. ............... | 251/129.15 |
| 6,742,764 B1 * | 6/2004 | Volz ......................... | 251/129.02 |
| 6,913,242 B2 * | 7/2005 | Reichert et al. .......... | 251/129.18 |
| 6,974,117 B2 * | 12/2005 | Dzialakiewicz et al. | 251/129.08 |

(Continued)

FOREIGN PATENT DOCUMENTS

WO WO 98/40258 A1 9/1998

(Continued)

*Primary Examiner* — John Fristoe, Jr.
*Assistant Examiner* — Marina Tietjen
(74) *Attorney, Agent, or Firm* — Ronald E. Greigg

(57) ABSTRACT

The invention relates to a magnetic valve having a magnetic assembly and a capsule. An armature is disposed in the capsule and a valve insert is inserted in the capsule. A tappet is guided in a displaceable manner within the inner bore of the valve insert and sealingly immerges in a sealing seat. The valve insert is arranged at a distance from the armature via an adjustable air gap. According to the invention, the sealing seat is arranged in a sleeve which itself is disposed inside the capsule. The sleeve has at least one opening through which adjusting elements act upon the valve seat in order to regulate the magnetic flux generated by the magnetic assembly. The air gap between the valve insert and the armature is variable, whereby the adjusting elements either move the valve insert in axial direction towards the armature in order to increase the magnetic flux or move the valve insert away from the armature in order to reduce the magnetic flux.

20 Claims, 6 Drawing Sheets

U.S. PATENT DOCUMENTS

2004/0089832 A1    5/2004    Wilde et al.

FOREIGN PATENT DOCUMENTS

| WO | WO 01/00473 | A1 | 1/2001 |
| WO | WO 01/14776 | A1 | 3/2001 |
| WO | WO 01/26946 | A1 | 4/2001 |
| WO | WO 02/12039 | A1 | 2/2002 |

* cited by examiner

MAGNETIC VALVE

CROSS-REFERENCE TO RELATED APPLICATION

This application is a 35 USC 371 application of PCT/EP 2006/069222 filed on Dec. 1, 2006.

BACKGROUND OF THE INVENTION

1. Field of the Invention

The invention is based on a magnetic.

2. Description of the Prior Art

A conventional magnetic valve, particularly for a hydraulic unit, which is used for instance in an anti-lock brake system (OBOIST) or traction control system (TCS) or an electronic stability program system (ESP system), is shown in FIG. 1. As can be seen from FIG. 1, the conventional magnetic valve 110 includes a magnet assembly 5 for generating a magnetic flux 5.1, which magnet assembly in turn includes a housing 5.2, a coil winding 5.3, a coil body 5.4, and a covering disk 5.5; and a valve cartridge, which includes a capsule 60, a valve insert 10, a tappet 20, a restoring spring 30, and an armature 7. In the production of the magnetic valve 110, the capsule 60 and the valve insert 10 of the valve cartridge are joined together by pressing, and the valve cartridge is hydraulically sealed off from the atmosphere by a sealing weld 8. In addition, the valve insert 10 absorbs the pressure forces that occur in the hydraulic system and carries them onward to a fluid block, via a wedging flange 10.1 in a wedging region, not shown. In addition, the valve insert 10 conducts the magnetic flux 5.1, introduced by the joined magnet assembly 5, axially in the direction of the armature 7 via an air gap 11. The valve insert 10 furthermore receives the so-called valve body 40, which includes a sealing seat 41 into which the tappet 20 dips in sealing fashion in order achieve the sealing function of the magnetic valve 110. As can also be seen from FIG. 1, the tappet 20 and the restoring spring 30 are guided in the valve insert 10. The attachment of the magnet assembly 5 at the bottom is accomplished by pressing the covering disk 5.5 directly onto the magnetically conductive valve insert 10 of the valve cartridge. The capsule 60, likewise pressed onto the valve insert 10 and welded, has a lower region which is thrust in overlapping fashion onto the valve insert 10.

To adapt the conventional magnetic valve 110, functions are as a rule established; that is, a calibration is performed, in order as much as possible to minimize and compensate for variations in such properties of the parts as their geometry, magnetic properties, and so forth. For doing so, usually components that are easily accessible from outside are displaced counter to one another in accordance with an adjustment instruction, for instance to produce an equilibrium between contrary forces, until in a final position the desired function is assured. For the adaptation, the moving components should be readily accessible, which can limit further development of the integration of the parts in optimizing valve assemblies. Hence the conventional magnetic valve 110, before a lower valve part 12 is installed, is calibrated with simultaneous subjection of it to pressure and introduction of magnetic force. The adjustment of the magnetic flux 5.1 and thus of the magnetic force is done by increasing or decreasing the size of the air gap 11 by axial displacement of the valve body 40.

In German Patent Application DE 102005044672.8, not published before the priority date of the present application, of the same Applicant, a magnetic valve is described which distributes the described functions of the valve insert over a plurality of components, so that the valve insert can be designed more simply. In the described magnetic valve, the overlapping region of the capsule is lengthened in the direction of the wedging region and is wedged with a valve bush in the wedging region with the fluid block. Moreover, as the lower part of the valve cartridge, a sleeve is fitted with a sealing seat into the lengthened capsule. Because of the lengthening of the capsule into the fluid block, the sealing from the atmosphere and the wedging with the fluid block are advantageously accomplished via the valve bush, and no longer via the valve insert. As a result, the valve insert is relieved and can be designed more simply. Furthermore, one production step, for sealingly welding the capsule to the valve insert, can be dispensed with. Because the components are fitted into one another in sleevelike fashion, however, calibrating the magnetic valve is difficult to do.

SUMMARY AND ADVANTAGES OF THE INVENTION

The magnetic valve of the invention has the advantage over the prior art that a sealing seat is disposed in a sleeve which is fitted into a capsule and has at least one opening, through which adjusting elements act on a valve insert for adjusting a magnetic flux generated by a magnet assembly. As a result, an air gap between the valve insert and an armature can be varied, and the adjusting elements move the valve insert axially toward the armature to increase the magnetic flux or move the valve insert axially away from the armature to decrease the magnetic flux. The adjusting elements according to the invention, which act via existing openings on the poorly accessible components, that is the valve insert, advantageously make it possible for even magnetic valves with components fitted into one another in sleevelike fashion to be easily calibrated and adjusted for function without major additional effort or expense. The invention makes use of the geometric properties, created by functional integration, of the magnetic valve so as to advantageously enable the calibration and function adjustment even via poorly accessible internal components.

It is especially advantageous that the capsule is wedged with a valve bush in a wedging region with a fluid block, thereby greatly simplifying the valve insert. For adjusting the air gap between the valve insert and the armature, a tappet dips sealingly into the sealing seat of the sleeve; that is, the sealing seat of the sleeve is closed during the calibration process.

In a feature of the magnetic valve of the invention, at least one check valve seat bore and/or at least one radial bore is used as the at least one opening in the sleeve. The adjusting elements act on the valve insert for instance via a nonpositive engagement and/or a positive engagement. For producing a positive engagement, the valve insert for instance has receiving means, which are preferably embodied as an annular groove that is engaged by the at least one adjusting element.

In a further feature of the magnetic valve of the invention, at least one adjusting element is solidly connected to the valve insert and acts on the valve insert through a first opening, and the at least one adjusting element, after the adjustment of the air gap, can be disconnected from the valve insert by means of a tool, for instance by means of a cutting tool, introduced through a second opening. Alternatively, at least one adjusting element can be embodied as a pair of grippers which can be introduced axially into the sleeve through two openings and acts axially on the valve insert.

In a further feature of the magnetic valve of the invention, at least one adjusting element can be introduced into the sleeve radially through at least one opening and acts, axially guided, on the valve insert. Alternatively, the at least one radially introduced adjusting element can act in a rotationally leverlike fashion on the valve insert.

BRIEF DESCRIPTION OF THE DRAWINGS

Advantageous embodiments, described below, of the invention as well as the conventional exemplary embodiment described above for better comprehension of the invention, are shown in the drawings. Shown are.

DESCRIPTION OF THE PREFERRED EMBODIMENTS

Figure 1:
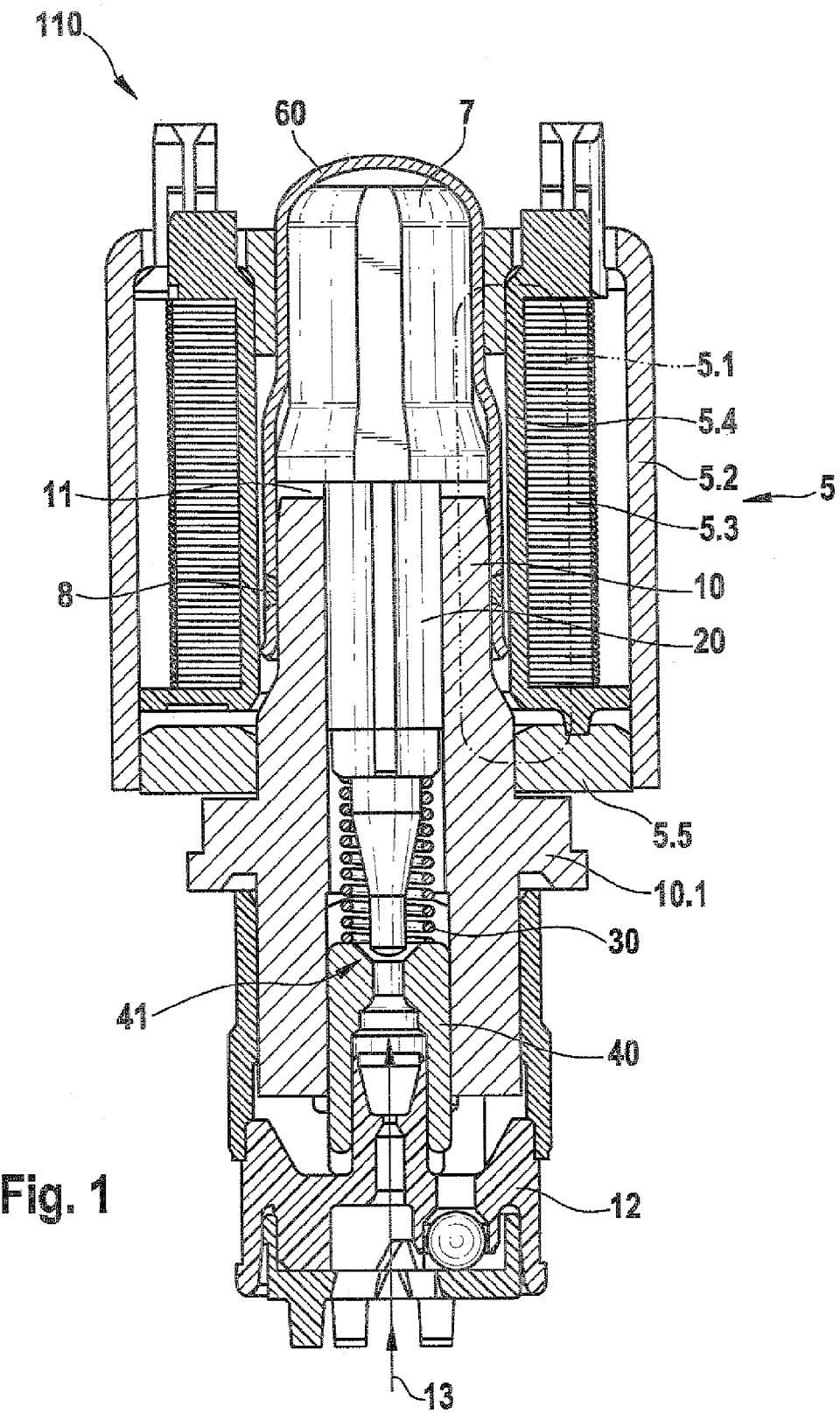
FIG. 1, a schematic sectional view of a conventional magnetic valve.
Figure 2:
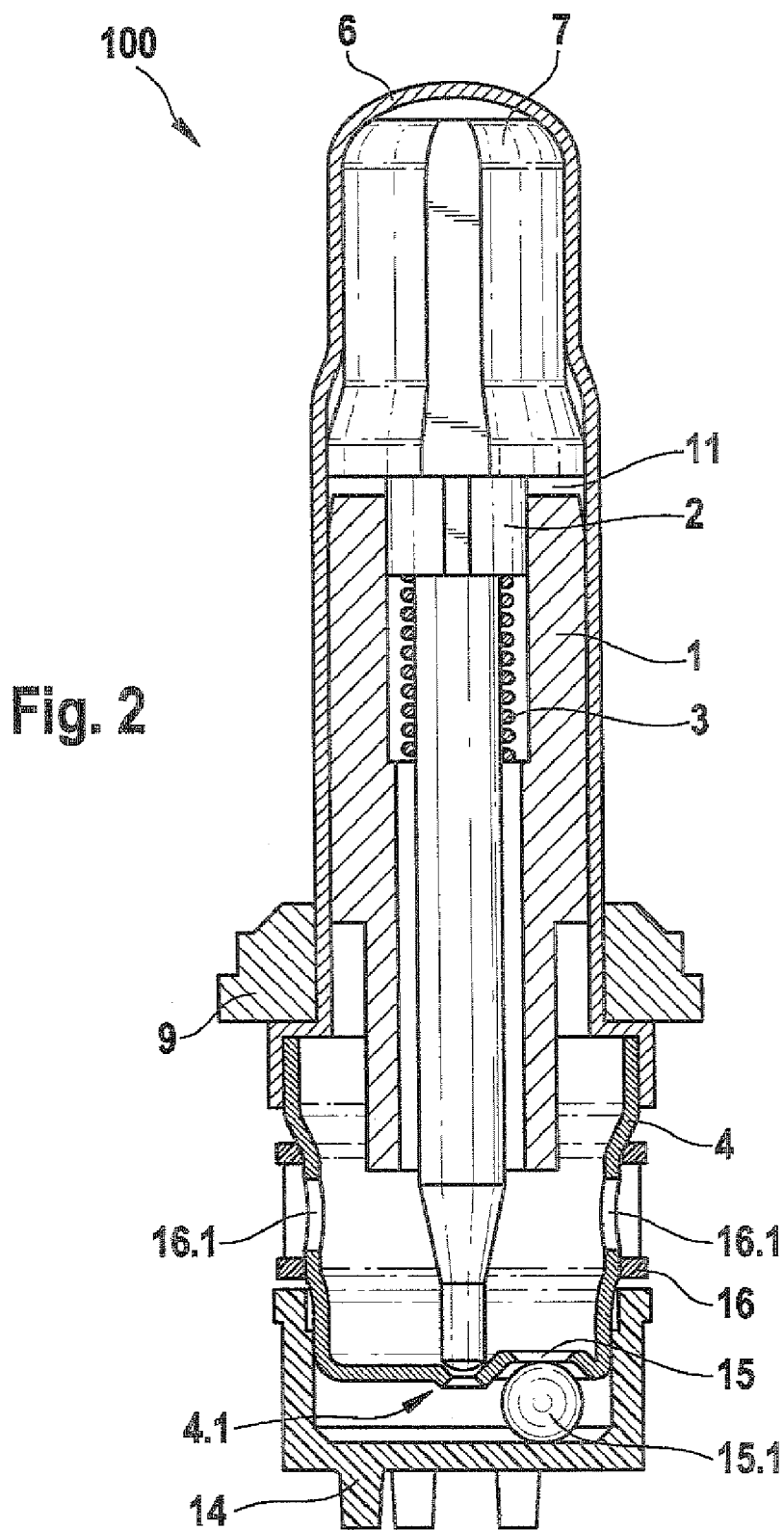
FIG. 2, a schematic sectional view of a valve cartridge for a magnetic valve of the invention.

As can be seen from FIG. 2, a valve cartridge 100 for a magnetic valve according to the invention, which valve cartridge is wedged via a valve bush 9 in a wedging region, not shown, with a fluid block, includes a capsule 6, a sleeve 4, a valve insert 1, a tappet 2 guided in an inner bore of the valve insert 1, a restoring spring 3 which is braced against the valve insert 1 in the inner bore and restores the tappet 2, and an armature 7. The capsule 6 is pushed in overlapping fashion onto the valve insert 1 and is embodied as a valve component that provides sealing from the atmosphere. In a distinction from the conventional magnetic valve 110 shown in FIG. 1, the capsule 6 is lengthened in the direction of the wedging region. As a result, the conventional sealing weld 8 of FIG. 1 can be omitted. Furthermore, the fluid forces and wedging forces are no longer absorbed by the valve insert 1 but rather by the valve bush 9 and are transmitted to the fluid block via the wedging region, not shown. In the capsule 6, the armature 7, which is unchanged from the conventional magnetic valve 110 of FIG. 1, acts and sets the tappet 2, which is unchanged in its function, into motion counter to the restoring spring 3. The lower part of the valve cartridge 100 and a sealing seat 4.1 are formed by the sleeve 4, which is fitted into the capsule 6. The valve cartridge 100 shown furthermore includes a flat filter 14 and an annular filter 16, which are connected to the sleeve 4. As can also be seen from FIG. 2, the sleeve 4 has radial bores 16.1 and a check valve seat bore 15, which with a check valve ball 15.1 forms a check valve. For constructing the magnetic valve of the invention, a magnet assembly, not shown, which for instance is equivalent to the conventional magnet assembly 5 of FIG. 1, is pushed onto the wedging region. A magnetic flux, introduced into the valve insert 1 via a wall of the capsule 6 by the magnet assembly, not shown, is conducted axially in the direction of the armature 7 by the valve insert 1 via an air gap 11. By varying the air gap 11 between the valve insert 1 and the armature 7, the magnetic flux and thus the magnetic force can be adjusted.

Below, in conjunction with FIGS. 3 through 6, the procedure for varying the air gap 11 between the valve insert 1 and the armature 7 for adjusting the magnetic flux will be described. For adjusting the magnetic flux generated by the magnet assembly, not shown, adjusting elements 17.1 through 17.5 act on the valve insert 1 through at least one opening 15, 16.1 in the sleeve 4, and by that means the air gap 11 between the valve insert 1 and the armature 7 can be varied. Hence the adjusting elements 17.1 through 17.5 move the valve insert 1 axially toward the armature 7, to increase the magnetic flux. To decrease the magnetic flux, the adjusting elements 17.2 through 17.5 can move the valve insert 1 axially away from the armature 7.

Figure 3:
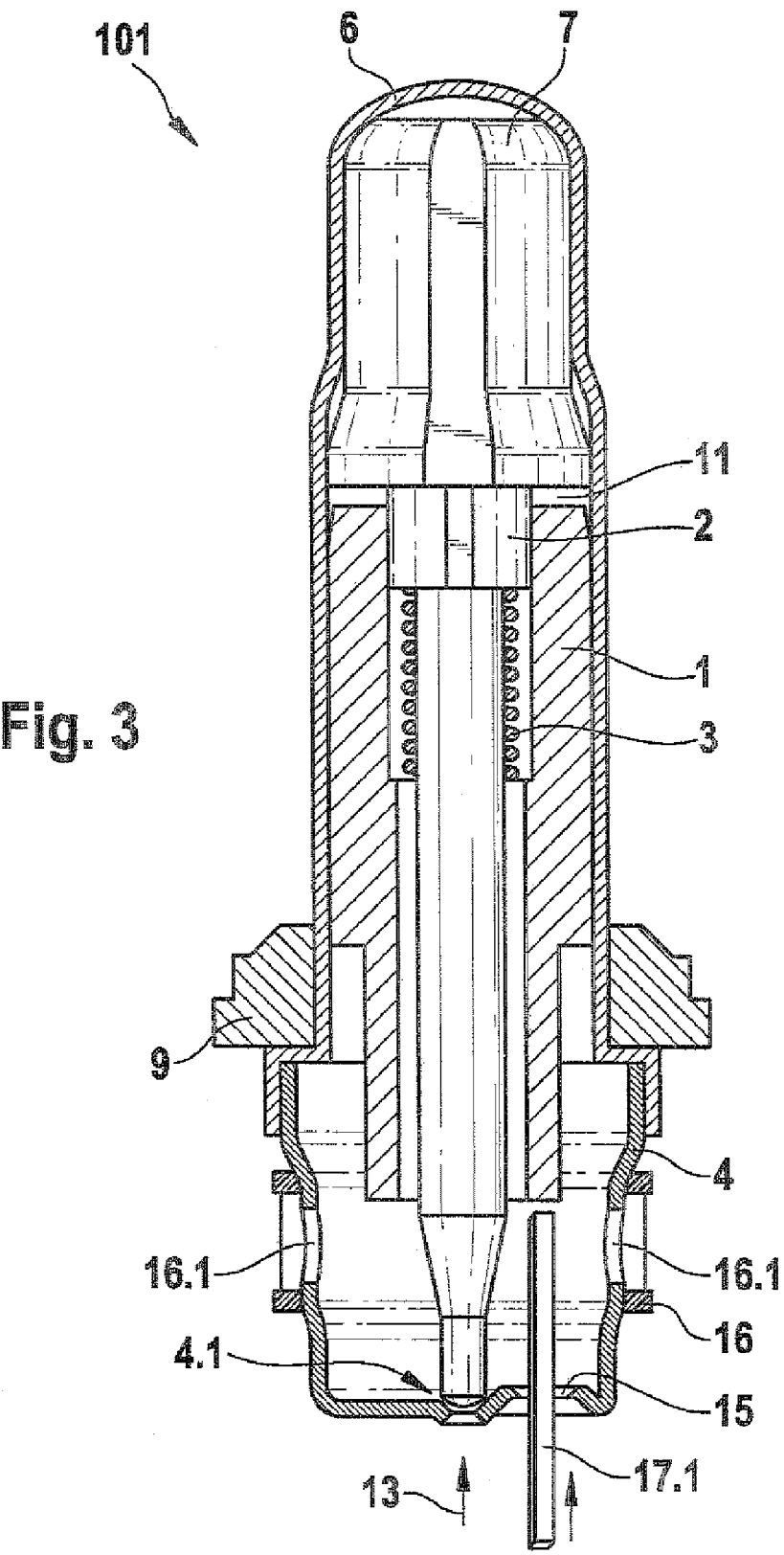
FIG. 3, a schematic sectional view of a valve cartridge for a magnetic valve of the invention, with a first exemplary embodiment of an adjusting element.

FIG. 3 shows a further schematic sectional view of a valve cartridge 101, which essentially corresponds to the valve cartridge 100 of FIG. 2, but in the valve cartridge 101, in a distinction from the valve cartridge 100 shown in FIG. 2, the flat filter 14 and the check valve ball 15.1 of FIG. 2 have not yet been installed, so that access to the valve insert 1 is possible via the check valve seat bore 15. As can be seen from FIG. 3, an adjusting element, embodied as a pin 17.1, is introduced via the check valve seat bore 15 and displaces the valve insert 1 axially upward, as a result of which the air gap 11 between the valve insert 1 and the armature 7 decreases in size, and the resultant magnetic flux and hence the magnetic force are increased. An enlargement of the air gap 11 with a resultant decrease in the magnetic flux and hence in the magnetic force is not possible with the first adjusting element 17.1. In the assembly of valve cartridge 100, the air gap 11 can therefore be set to a maximum value, which can be reduced in the calibration by the first adjusting element 17.1 until full functionality is achieved. After that, the other components, such as the check valve ball 15.1 and the flat filter 14, can be installed in order to complete the valve cartridge 101. The calibration of the valve cartridge 101 is effected with simultaneous pressure subjection 13 and introduction of magnetic force, or in other words with a closed sealing seat 4.1.

Figure 4:
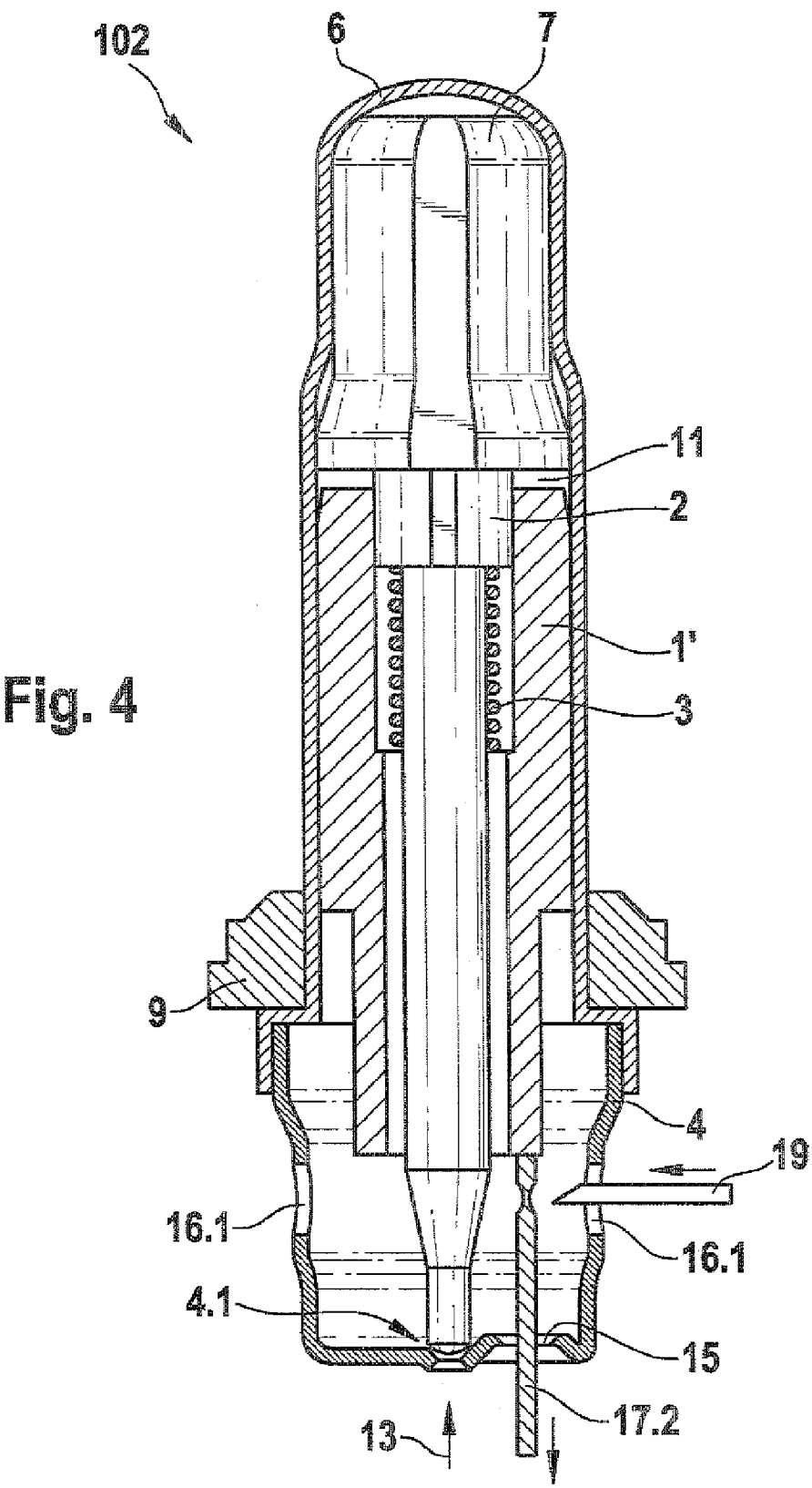
FIG. 4, a schematic sectional view of a valve cartridge for a magnetic valve of the invention, with a second exemplary embodiment of an adjusting element.

FIG. 4 shows a further schematic sectional view of a valve cartridge 102, which essentially corresponds to the valve cartridge 100 of FIG. 2, but in the valve cartridge 102, in a distinction from the valve cartridge 100 shown in FIG. 2, the flat filter 14, the annular filter 16, and the check valve ball 15.1 of FIG. 2 have not yet been installed, so that access to the valve insert 1' is possible via the check valve seat bore 15 and the radial bores 16.1. As can be seen from FIG. 4, as a further distinction, an adjusting element embodied as a tie rod 17.2 is integrally formed onto the valve insert 1' of the valve cartridge 102; it acts on the valve insert 1' via the check valve seat bore 15 and can pull the valve insert 1' axially downward, as a result of which the air gap 11 between the valve insert 1 and the armature 7 is enlarged, and the resultant magnetic flux and hence the magnetic force are lessened. A reduction of the size of the air gap 11 with a resultant increase in the magnetic flux and hence the magnetic force is likewise possible with the second adjusting element 17.2, since the valve insert 1' can be pressed upward in the direction of the armature 7 via the tie rod 17.2 to decrease the size of the air gap 11. Therefore in the assembly of the valve cartridge 100, the air gap 11 can be set for instance to an arbitrary value, preferably a minimal value, which can be increased or decreased in the calibration by the second adjusting element 17.2 until full functionality is reached. After the calibration, the tie rod 17.2 is disconnected from the valve insert 1', for instance by means of a cutting tool 19 introduced into the sleeve 4 via the radial bore 16.1. Next, the other components, such as the annular filter 16, the check valve ball 15.1, and the flat filter 14, can be installed in order to complete the valve cartridge 102. The calibration of the valve cartridge 102 is again effected with simultaneous pressure subjection 13 and introduction of magnetic force, or in other words with a closed sealing seat 4.1.

Figure 5:
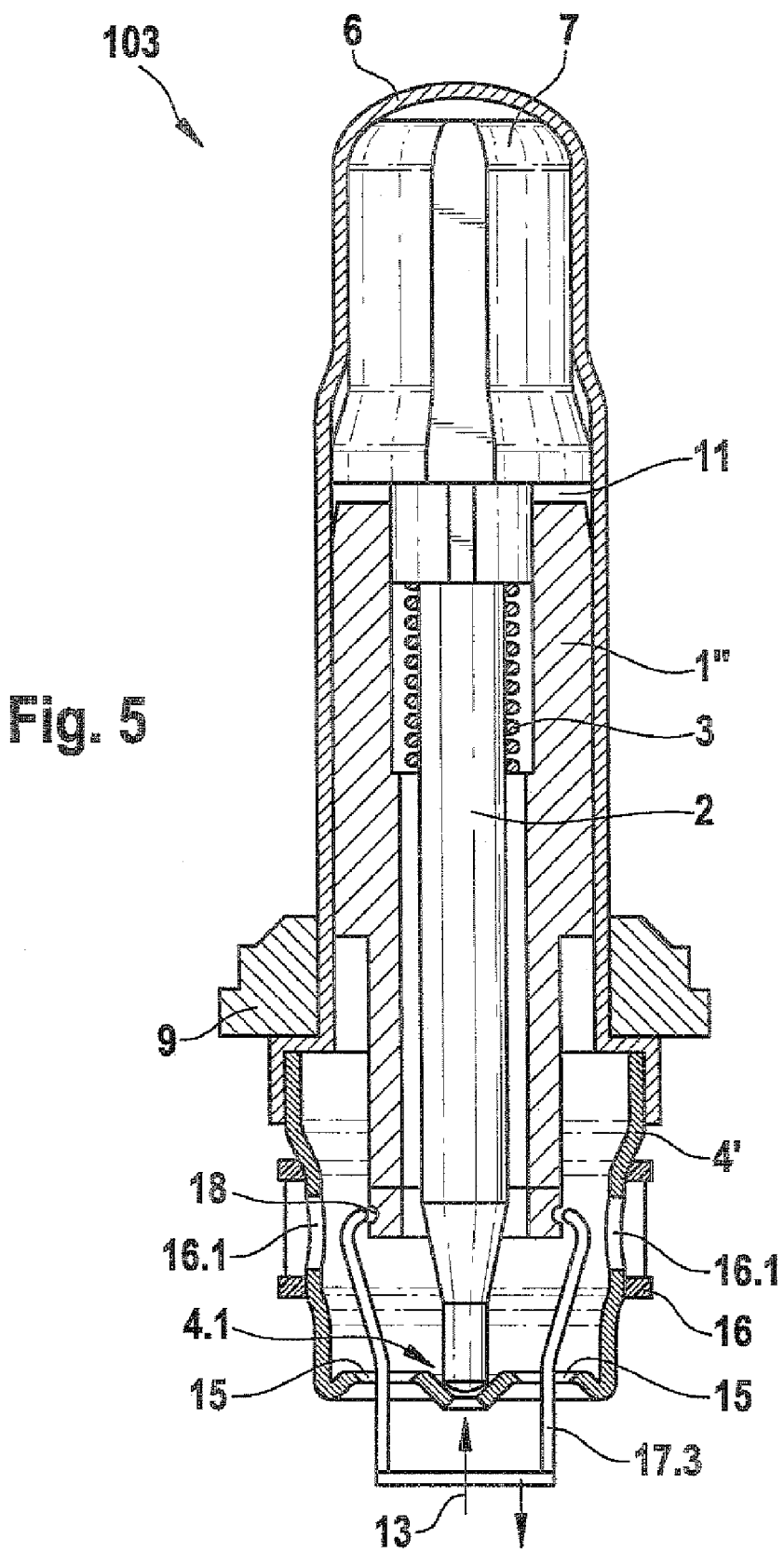
FIG. 5, a schematic sectional view of a valve cartridge for a magnetic valve of the invention, with a third exemplary embodiment of an adjusting element.

FIG. 5 shows a further schematic sectional view of a valve cartridge 103, which corresponds essentially to the valve cartridge 100 of FIG. 2, but in a distinction from the valve cartridge 100 shown in FIG. 2, a sleeve 4' of the valve cartridge 103 includes two check valve bores 15 for receiving check valve balls 15.1, and a valve insert 1" of the valve cartridge 103 has receiving means which are embodied as an annular groove 18. In the valve cartridge 103 shown, the flat filter 14 and the check valve balls 15.1 have not yet been installed, so that access to the valve insert 1" is possible via the check valve seat bores 15. As can be seen from FIG. 5, an adjusting element embodied as a pair 17.3 of grippers can act on the receiving means 18, introduced into the valve insert 1", by means of a positive engagement and can pull the valve insert 1" axially downward, as a result of which the air gap 11 between the valve insert 1" and the armature 7 is enlarged, and the resultant magnetic flux and hence the magnetic force are reduced, or can slide the valve insert 1" upward, as a result of which a reduction in the size of the air gap 11 and a resultant increase in the magnetic flux and hence the magnetic force are attained. Therefore upon the assembly of the valve cartridge 103, the air gap 11 can be set for instance to an arbitrary value, preferably a minimal value, which can be increased or decreased in the calibration by the third adjusting element 17.3 until full functionality is achieved. Next, the other components, such as the check valve balls 15.1 and the flat filter 14, can be installed in order to complete the valve cartridge 103. Once again, the calibration of the valve cartridge 103 is effected with simultaneous pressure subjection 13 and introduction of magnetic force, or in other words with a closed sealing seat 4.1. Alternatively, the encompassing annular groove 18 on the valve insert 1" can be dispensed with, and the pair 17.3 of grippers protruding through the check valve bores 15 can act on the valve insert 1" via a nonpositive engagement. However, the receiving means 18 make access to the valve insert 1" easier.

Figure 6:
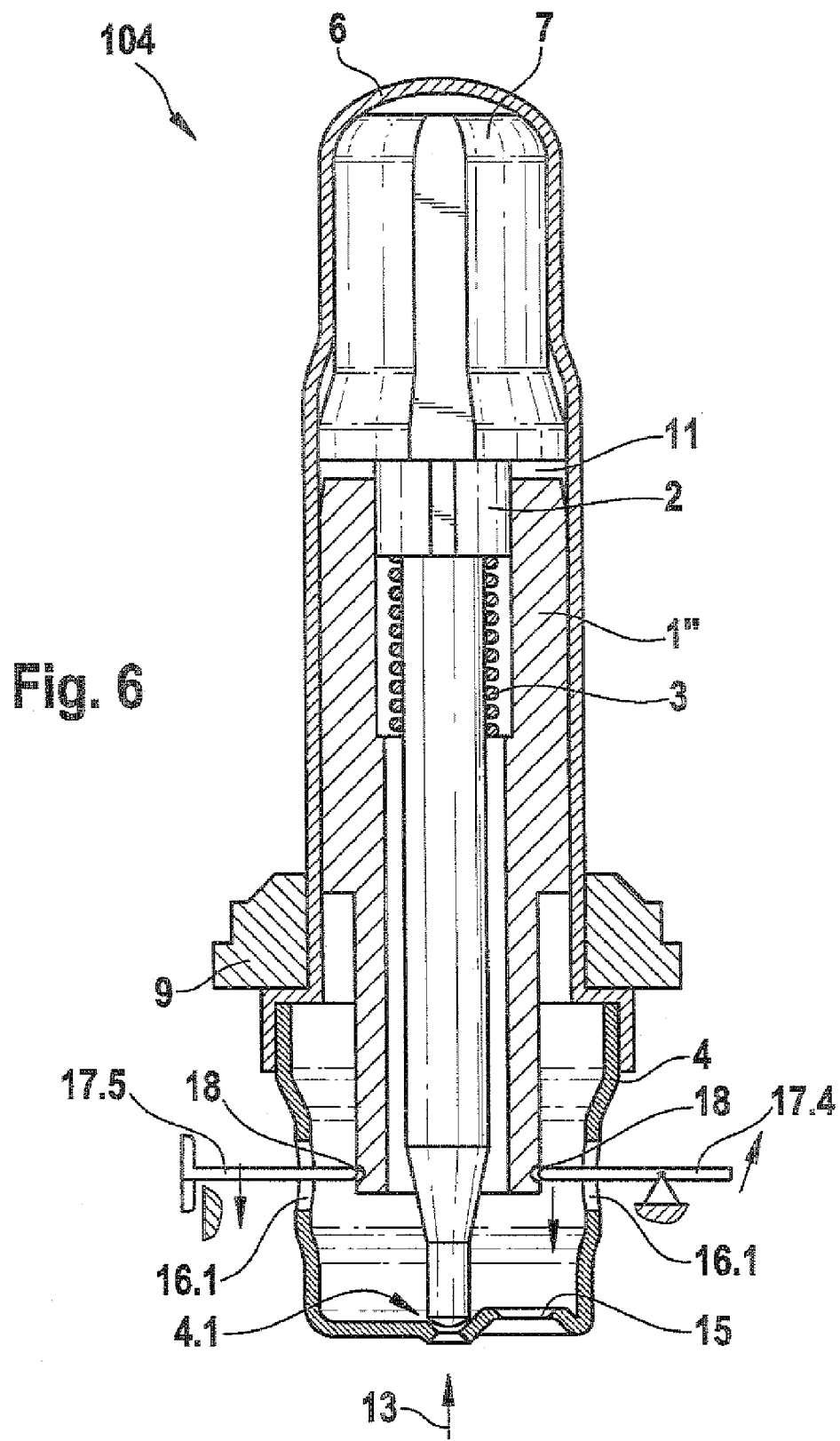
FIG. 6, a schematic sectional view of a valve cartridge for a magnetic valve of the invention, with fourth and fifth exemplary embodiments of an adjusting element.

FIG. 6 shows a further schematic sectional view of a valve cartridge 104, which essentially corresponds to the valve cartridge 100 of FIG. 2, but in a distinction from the valve cartridge 100 shown in FIG. 2, a valve insert 1' of the valve cartridge 104 has receiving means embodied as an annular groove 18, and in the valve cartridge 104, the annular filter 16, the flat filter 14, and the check valve ball 15.1 have not yet been mounted, so that access to the valve insert 1" is possible via the check valve seat bores 15 and the radial bores 16.1. As can be seen from FIG. 6, adjusting elements 17.4, 17.5 embodied as grippers or pins can act via the radial bores 16.1 by means of a positive engagement on the receiving means 18 inserted into the valve insert 1" and can slide the valve insert 1" axially downward, as a result of which the air gap 11 between the valve insert 1" and the armature 7 increases in size, and the resultant magnetic flux and hence the magnetic force are decreased, or can slide the valve insert 1" axially upward, by means of which a reduction in size of the air gap 11 and a resultant increase in the magnetic flux and thus in the magnetic force are attained. In the assembly of the valve cartridge 104, the air gap 11 can therefore be set for instance to an arbitrary value, preferably a minimal value, which can be increased or decreased in the calibration by the fourth and/or fifth adjusting element 17.4, 17.5 until full functionality is reached. To illustrate various possible embodiments, as can also be seen from FIG. 6, the fourth adjusting element 17.4 acts on the valve insert 1" via a leverlike, rotational motion, and the fifth adjusting element acts on the valve insert 1" via a purely axially executed motion. Next, the further components, can be installed, such as the annular filter 16, the check valve ball 15.1, and the flat filter 14, in order to complete the valve cartridge 104. The calibration of the valve cartridge 104 is again effected with simultaneous pressure subjection 13 and introduction of magnetic force, or in other words with a closed sealing seat 4.1.

In the embodiments of the invention described, the bores integrated into the sleeve for the check valve seats and/or the radial outflow bores are advantageously used for axially displacing the valve insert. As a result, the remanent air gap and thus the magnetic force can be adjusted in turn. As a consequence of the functional integration, the sleeve carries both the primary valve sealing seat and the seat for one or more check valves.

The foregoing relates to the preferred exemplary embodiment of the invention. it being understood that other variants and embodiments thereof are possible within the spirit and scope of the invention, the latter being defined by the appended claims.

The invention claimed is:

1. A magnetic valve, comprising:
   a magnet assembly;
   a capsule;
   an armature disposed in the capsule;
   a valve insert thrust into the capsule;
   a tappet guided movably in an inner bore of the valve insert;
   a sealing seat which tappet dips in sealing fashion into;
   an adjustable air gap disposed between and spacing apart the valve insert from the armature; and
   a sleeve having the sealing seat disposed therein, the sleeve being fitted into the capsule and having at least one opening, wherein an adjusting element for adjusting a magnetic flux generated by the magnet assembly acts on the valve insert through the at least one opening in the sleeve, as a result of which the air gap between the valve insert and the armature is variably adjusted, and the adjusting element, to increase the magnetic flux, moves the valve insert axially toward the armature.

2. The magnetic valve according to claim 1, wherein the capsule is wedged to a valve bush with a fluid block.

3. The magnetic valve according to claim 2, wherein the tappet, for adjusting the air gap between the valve insert and armature, dips sealingly into the sealing seat of the sleeve.

4. The magnetic valve according to claim 2, wherein the at least one opening in the sleeve includes at least one check valve seat bore and/or at least one radial bore.

5. The magnetic valve according to claim 2, wherein the adjusting element acts on the valve insert via a nonpositive engagement and/or a positive engagement.

6. The magnetic valve according to claim 5, wherein for producing a positive engagement, the valve insert has receiving means embodied as an annular groove which is engaged by the adjusting element.

7. The magnetic valve according to claim 1, wherein the tappet, for adjusting the air gap between the valve insert and armature, dips sealingly into the sealing seat of the sleeve.

8. The magnetic valve according to claim 7, wherein the at least one opening in the sleeve includes at least one check valve seat bore and/or at least one radial bore.

9. The magnetic valve according to claim 7, wherein the adjusting element acts on the valve insert via a nonpositive engagement and/or a positive engagement.

10. The magnetic valve according to claim 9, wherein for producing a positive engagement, the valve insert has receiving means embodied as an annular groove which is engaged by the adjusting element.

11. The magnetic valve according to claim 1, wherein the at least one opening in the sleeve includes at least one check valve seat bore and/or at least one radial bore.

12. The magnetic valve according to claim 11, wherein the adjusting element acts on the valve insert via a nonpositive engagement and/or a positive engagement.

13. The magnetic valve according to claim 12, wherein for producing a positive engagement, the valve insert has receiving means embodied as an annular groove which is engaged by the adjusting element.

14. The magnetic valve according to claim 1, wherein the adjusting element acts on the valve insert via a nonpositive engagement and/or a positive engagement.

15. The magnetic valve according to claim 14, wherein for producing a positive engagement, the valve insert has receiving means embodied as an annular groove which is engaged by the adjusting element.

16. The magnetic valve according to claim 1, wherein at least one adjusting element is solidly connected to the valve insert and acts on the valve insert through a first opening, and, to decrease the magnetic flux, moves the valve insert axially away from the armature, and the at least one adjusting element, after the adjustment of the air gap, is disconnected from the valve insert by means of a tool introduced through a second opening.

17. The magnetic valve according to claim 1, wherein at least one adjusting element is embodied as a pair of grippers which are introduced axially into the sleeve through two openings and which acts axially on the valve insert, and, to decrease the magnetic flux, moves the valve insert axially away from the armature.

18. The magnetic valve according to claim 1, wherein at least one adjusting element is introduced into the sleeve radially through at least one opening and acts, axially guided, on the valve insert, and, to decrease the magnetic flux, moves the valve insert axially away from the armature.

19. The magnetic valve according to claim 1, wherein at least one adjusting element is introduced into the sleeve radially through at least one opening and acts in a rotationally leverlike fashion on the valve insert, and, to decrease the magnetic flux, moves the valve insert axially away from the armature.

20. The magnetic valve according to claim 1, wherein the valve insert is movable with respect to the capsule in order to adjust the air gap,
   wherein the at least one opening in the sleeve is axially aligned with the valve insert, and
   wherein the adjusting element is a pin which is inserted through the at least one opening and displaces the valve insert axially toward the armature such that the air gap decreases in size.

* * * * *